(12) United States Patent
Pamphile et al.

(10) Patent No.: US 12,709,316 B2
(45) Date of Patent: Aug. 18, 2026

(54) HIGH-TECH SHOPPING CART

(71) Applicants: William Pamphile, Malden, MA (US); Lande Pamphile, Malden, MA (US); William Pamphile, II, Malden, MA (US); Willande Pamphile, Malden, MA (US); Wilmayer Pamphile, Malden, MA (US)

(72) Inventors: William Pamphile, Malden, MA (US); Lande Pamphile, Malden, MA (US); William Pamphile, II, Malden, MA (US); Willande Pamphile, Malden, MA (US); Wilmayer Pamphile, Malden, MA (US)

( * ) Notice: Subject to any disclaimer, the term of this patent is extended or adjusted under 35 U.S.C. 154(b) by 309 days.

(21) Appl. No.: 18/473,883

(22) Filed: Sep. 25, 2023

(65) Prior Publication Data

US 2025/0100607 A1 Mar. 27, 2025

(51) Int. Cl.

| | |
|---|---|
| ***B62B 5/00*** | (2006.01) |
| ***B62B 3/00*** | (2006.01) |
| ***B62B 3/14*** | (2006.01) |
| ***B62B 5/02*** | (2006.01) |
| ***G06Q 20/20*** | (2012.01) |
| ***G06Q 30/0601*** | (2023.01) |

(52) U.S. Cl.

CPC ............ *B62B 3/1424* (2013.01); *B62B 3/002* (2013.01); *B62B 5/0043* (2013.01); *B62B 5/0053* (2013.01); *B62B 5/02* (2013.01); *G06Q 20/201* (2013.01); *G06Q 20/203* (2013.01); *G06Q 30/0633* (2013.01); *G06Q 30/0641* (2013.01)

(58) Field of Classification Search

CPC ..... B62B 3/1424; B62B 3/002; B62B 5/0043; B62B 5/0053; B62B 5/02; G06Q 20/201; G06Q 20/203; G06Q 30/0633; G06Q 30/0641

See application file for complete search history.

(56) References Cited

U.S. PATENT DOCUMENTS

| | | | | |
|---|---|---|---|---|
| 5,773,954 | A | 6/1998 | VanHorn | |
| 2003/0085538 | A1 * | 5/2003 | Mansons | B62B 3/146 280/33.992 |
| 2015/0206121 | A1 | 7/2015 | Joseph | |
| 2015/0371320 | A1 | 12/2015 | Argue et al. | |
| 2017/0344935 | A1 * | 11/2017 | Mattingly | G06Q 10/087 |
| 2018/0068357 | A1 | 3/2018 | High et al. | |
| 2020/0031380 | A1 * | 1/2020 | Kadiyala | B62J 27/00 |
| 2020/0210982 | A1 * | 7/2020 | Lapidos-Salaiz | B62B 3/1424 |

* cited by examiner

*Primary Examiner* — Edwin A Young

(74) *Attorney, Agent, or Firm* — Lambert Shortell & Connaughton; David J. Connaughton, Jr.; Justin P. Tinger

(57) ABSTRACT

The high-tech shopping cart disclosed herein has four independently controlled wheels, multiple storage compartments, and a controller managing item selection and pricing. Equipped with sensors for obstacle detection, a user-friendly interface, and wireless communication capabilities, the cart offers real-time budget tracking and eliminates the need for traditional checkout queues. Shoppers can interact with the cart via a mobile app, making shopping more convenient and efficient. With autonomous movement and advanced features, this high-tech shopping cart enhances shopping and checkout processes within stores or retail establishments.

9 Claims, 9 Drawing Sheets

FIG. 1 - Prior Art

HIGH-TECH SHOPPING CART

TECHNICAL FIELD

This application generally relates to an article of manufacture for providing a shopping aid device, and more specifically, to a high-tech shopping cart.

BACKGROUND

Grocery shoppers have always manually pushed shopping carts about a store to select items for purchase before taking the items to a checkout line to determine the cost and provide payment for the items. While selecting items, a shopper typically does not know whether the selected items are within a budgeted amount, especially for items that are priced by weight. People spend more than 3 to 4 hours in a grocery store and stand for several minutes in a line to pay for the groceries. All of these characteristics make shopping a difficult process.

Therefore, a need exists for an article of manufacture for providing a high-tech shopping cart. The present invention attempts to address the limitations and deficiencies in prior solutions according to the principles and example embodiments disclosed herein.

SUMMARY

In accordance with the present invention, the above and other problems are solved by providing an article of manufacture for a high-tech shopping cart according to the principles and example embodiments disclosed herein.

In one embodiment, the present invention is a high-tech shopping cart comprising four wheels for movement with a retail establishment. In this embodiment, the high-tech shopping cart also includes storage compartments for accommodating selected items; a controller configured to manage item selection and calculate a total purchase price; and a database communicatively couple to the controller. The database stores information related to the selected items, and the shopping cart also includes a user interface with a display device and control input devices. The shopping cart further includes sensors, a battery for power supply, and at least one motor for autonomous movement.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
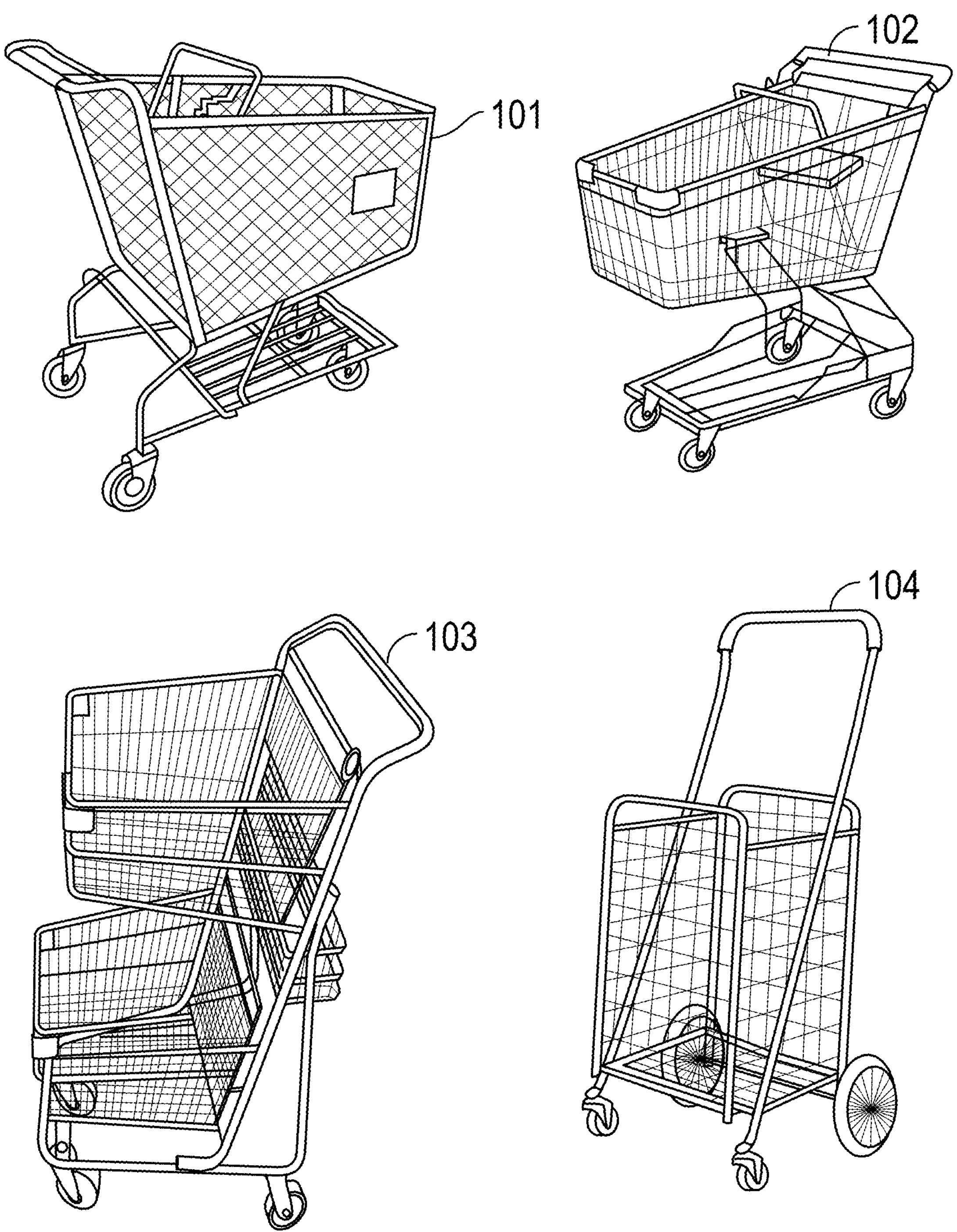
FIG. 1 illustrates example embodiments of shopping carts available in the prior art.

This application generally relates to an article of manufacture for providing a shopping aid device, and more specifically, to an article of manufacture providing a high-tech shopping cart according to the present invention.

Various embodiments of the present invention will be described in detail with reference to the drawings, wherein reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components, but do not preclude the presence or addition of one or more other features, steps or components. It also should be noted that in some alternative implementations, the functions and acts noted may occur out of the order noted in the figures. For example, two figures shown in succession may be executed substantially concurrently or sometimes in reverse order, depending upon the functionality and acts involved.

The terms "individual" and "user" refer to an entity, e.g., a human, using an article of manufacture providing a high-tech shopping cart according to the present invention. The term user herein refers to one or more users.

The term "invention" or "present invention" refers to the invention being applied via the patent application with the title "High-Tech Shopping Cart." The invention may be used interchangeably with the cart.

In general, the present invention relates to an article of manufacture providing a high-tech shopping cart according to the present invention. To better understand the present invention, FIG. 1 illustrates example embodiments of shopping carts available in the prior art. Different existing shopping carts 101-104 are shown in FIG. 1. All of the shopping carts 101-104 have a single item container of different sizes and shapes coupled to a plurality of wheels. The shopping carts 101-104 all are moved by a shopper/user directly moving the shopping carts between locations by pulling and/or pushing the cart.

To enhance the shopping experience, the present invention offers a seamless and time-saving solution. Customers may forego the hassle of searching for products and waiting in checkout lines, as payment may be effortlessly processed either on their smartphones or directly through the high-tech shopping cart. Once payment is completed, the shopping cart's system may ensure security by automatically erasing all transaction information, protecting customers' private information.

For convenience, customers may connect their smartphones to the store or retail establishment's dedicated mobile application, enabling a pre-shopping experience. The mobile application may be operable to allow users to curate a list of desired items and save their selections. Upon arriving at the store, the customers may select any available high-tech shopping cart, scan the cart's barcode, and instantly link their smartphone to the store's system. Leveraging store GPS functionality or a location database, the high-tech shopping cart may guide shoppers to the locations of their selected items on the store's shelves, streamlining the entire shopping process. Customers may then transfer their selected items into their chosen shopping cart.

In one embodiment, customers may input their grocery list on their smartphone and transmit it to the mobile application. Upon receipt, the store's system may generate a unique shopping cart barcode, which customers may download onto their smartphones to monitor their shopping progress remotely. Once their shopping is complete, customers may choose between pickup and delivery options, with store personnel efficiently managing the order according to the customer's preferences.

Figure 2:
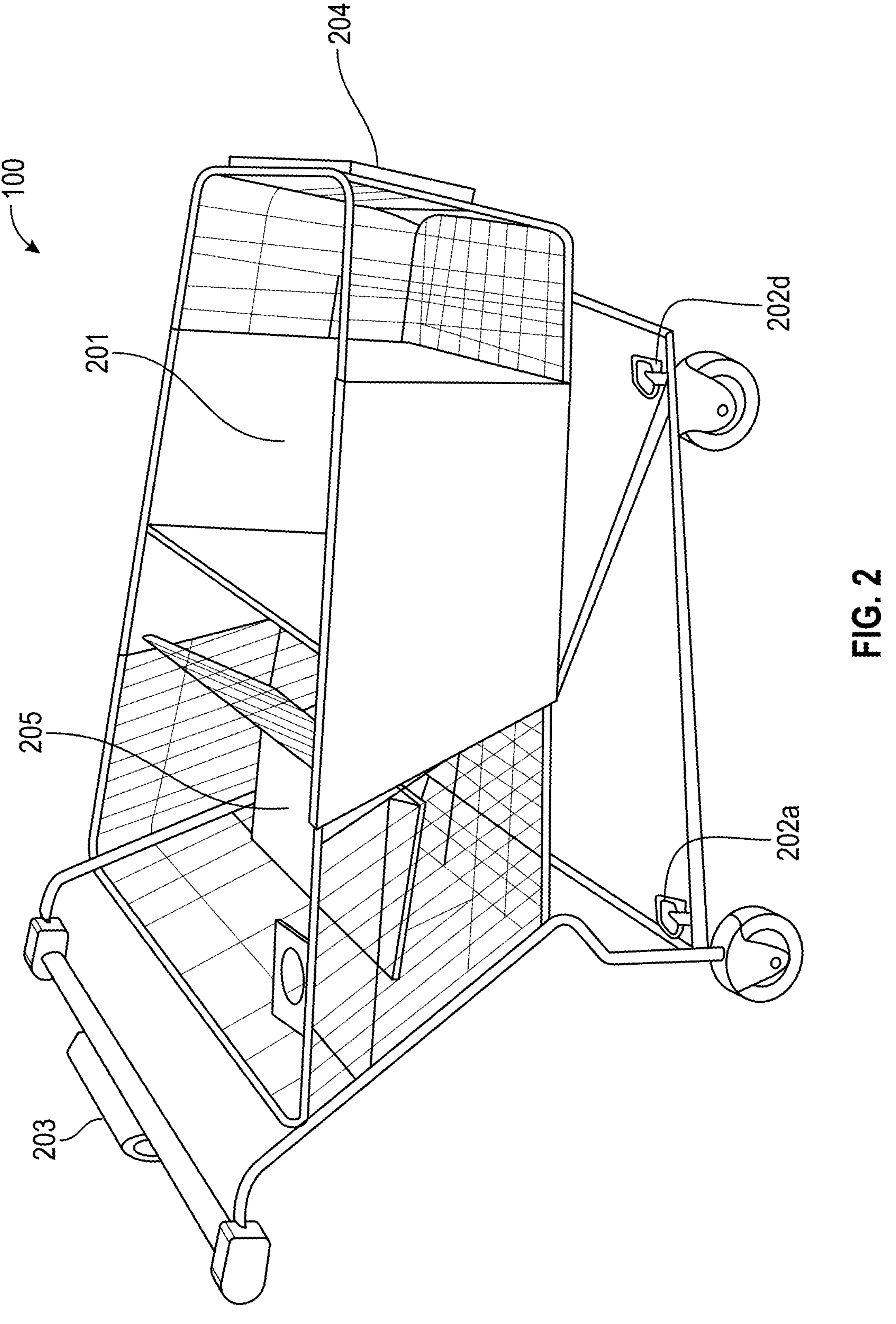
FIG. 2 illustrates an article of manufacture providing a high-tech shopping cart according to the present invention.

Turning now to FIG. 2, which illustrates a high-tech shopping cart according to the present invention. The high-tech shopping cart 100 attempts to make a frequent chore in life a lot easier. This improved technology allows consumers to be more efficient and save valuable time by using a smartphone and the high-tech shopping cart system to communicate with a store's database while shopping.

The high-tech self-checking shopping cart 100 is a technology system designed to also track the shopper's budget as he/she moves through a store. This shopping cart 100 may be used in markets, clothing stores, hardware stores, and many other retail establishments. Customers will not have to stay in line to pay; payment can be made on the smartphone or shopping cart.

A top view of a high-tech shopping cart 100 is shown in FIG. 2. In a preferred embodiment, the shopping cart 100 is 36" to 48" long×36" large and 30" to 36" deep. The shopping cart 100 has four (4) storage compartments 201*a*-*d*. The shopping cart 100 also comprises a 72-hour battery having 2 hours of operating power when fully charged. Multiple motors 202*a*-*d*, which in a preferred embodiment comprise 2 or 4 motors, to move the shopping cart 100 about a store. An automated, locking hard cover (not shown) may be present for when shopping is completed or the cart is left unattended. The front of the shopping cart 100 has sensors 204 communicatively coupled to a controller 401, shown in FIG. 4, to stop the cart when reaching too close to someone else.

The bottom base of the shopping cart 100 is about 2 inches off the floor. The front of the shopping cart 100 should be 3 to 4 inches smaller than the back. In cases where a store owner wants to provide customers with a cart at the front of the store, the carts need to nest together. The shopping cart frame can be adjusted lower or higher depending on the number of items purchased.

The cart controller 401 also may be communicatively coupled to a dashboard 203 having a computer screen display 411 and user input controls 412, a GPS receiver 408, one or more turning lights, and light emitting diode ("LED") lights 403. The cart controller 401 communicates with a store database 410 regarding items being selected with price and product information.

The shopping cart 100 may be constructed having different colors. The shopping cart 100 may weigh between 8-10 pounds. The shopping cart 100 has a capacity to hold between 400-450 pounds of selected items. The high-tech shopping cart 100 may traverse stairs with customer support (not shown). In one embodiment, the stair climber (shown in FIG. 3) may be located at the bottom of the shopping cart 100, and uses a descending automatic winch to pull the shopping cart 100 up and down stairs.

The database 410 may be located within the cart controller 401 for use when operated by a shopper. The database 410 also may be located within a store server 430 shown in FIG. 4 in which the cart controller 401 is communicatively coupled to the store server 403 using a wireless network or the Internet 110. Within database 410, all merchandise includes data supplying the details of the selected items, where the product originated, and the ingredients of the products. The selected items have a unique barcode identifying them. The database 410 references all data provided to the cart controller 401 using a unique identifier contained within the barcode. The barcode on each selected item is placed on the bottom of the packaging.

A separate wireless item tracker (not shown) may be included within the selected item. If the customer blocks or removes the barcode from the selected item packaging, the item tracer from within the selected item wirelessly communicates with the cart controller 401, using RFID devices, for example, to obtain the selected item's unique ID when the selected item is placed within the shopping cart 100 without scanning the barcode. The cart controller 401 may activate an alarm until the selected item is removed from the cart for scanning or is returned to the store shelving. The database 410 also may supply the cart controller 401 with expiration dates and price data for all merchandise.

Figure 3:
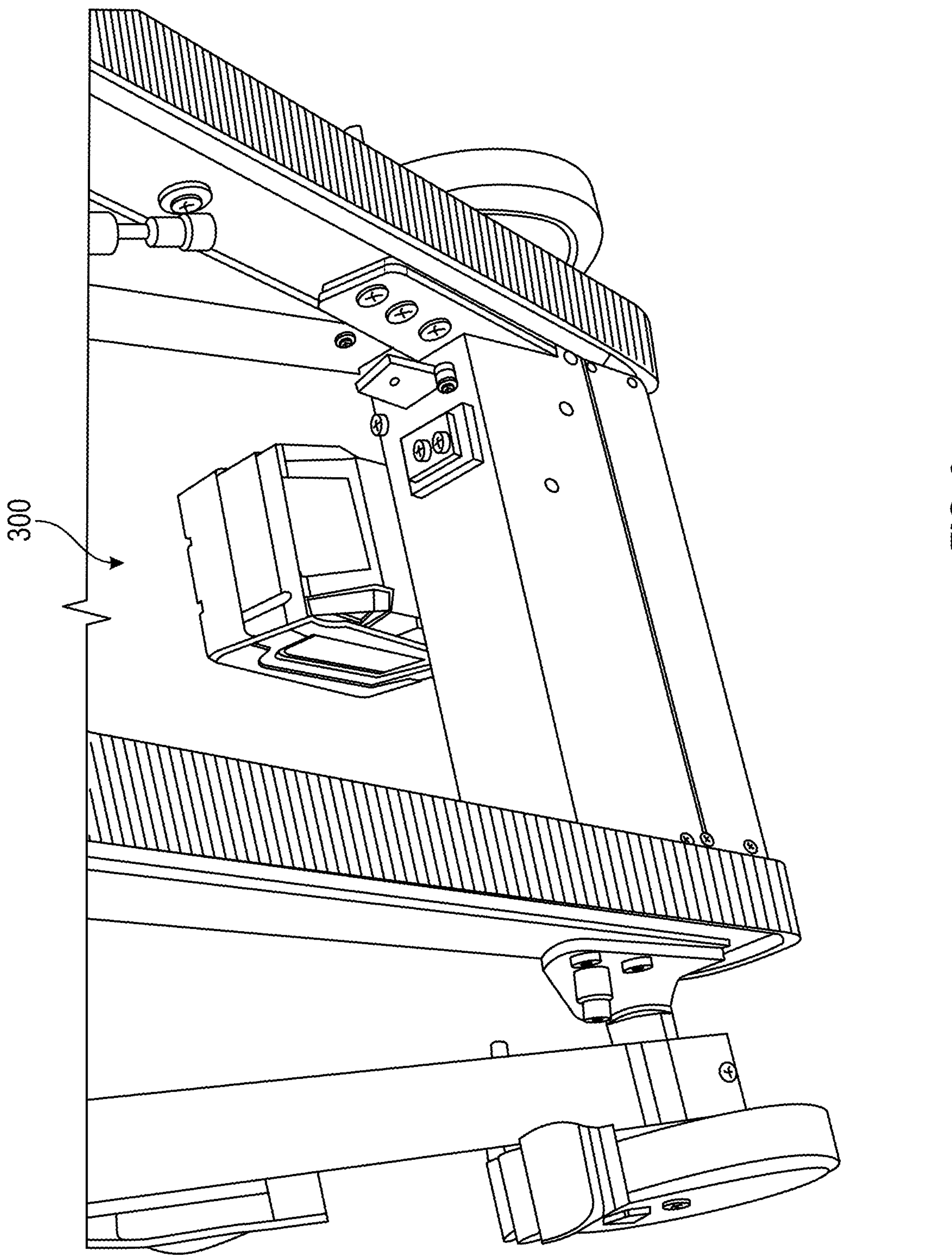
FIG. 3 illustrates an electric motor in an article of manufacture providing a high-tech shopping cart according to the present invention.

FIG. 3 illustrates an electric motor 300 in an article of manufacture providing a high-tech shopping cart according to the present invention. The four (4) motors 202*a*-*d* connected to each wheel of the high-teach shopping cart 100, shown in FIG. 2, may be the electric motor 300, shown in FIG. 3. In one embodiment, the high-tech shopping cart 100 does not comprise an axle connecting one or more wheels, and the electric motor 300 does not connect to an axle. Rather, in such an embodiment, each electric motor 300 connects directly to its respective wheel.

Figure 4:
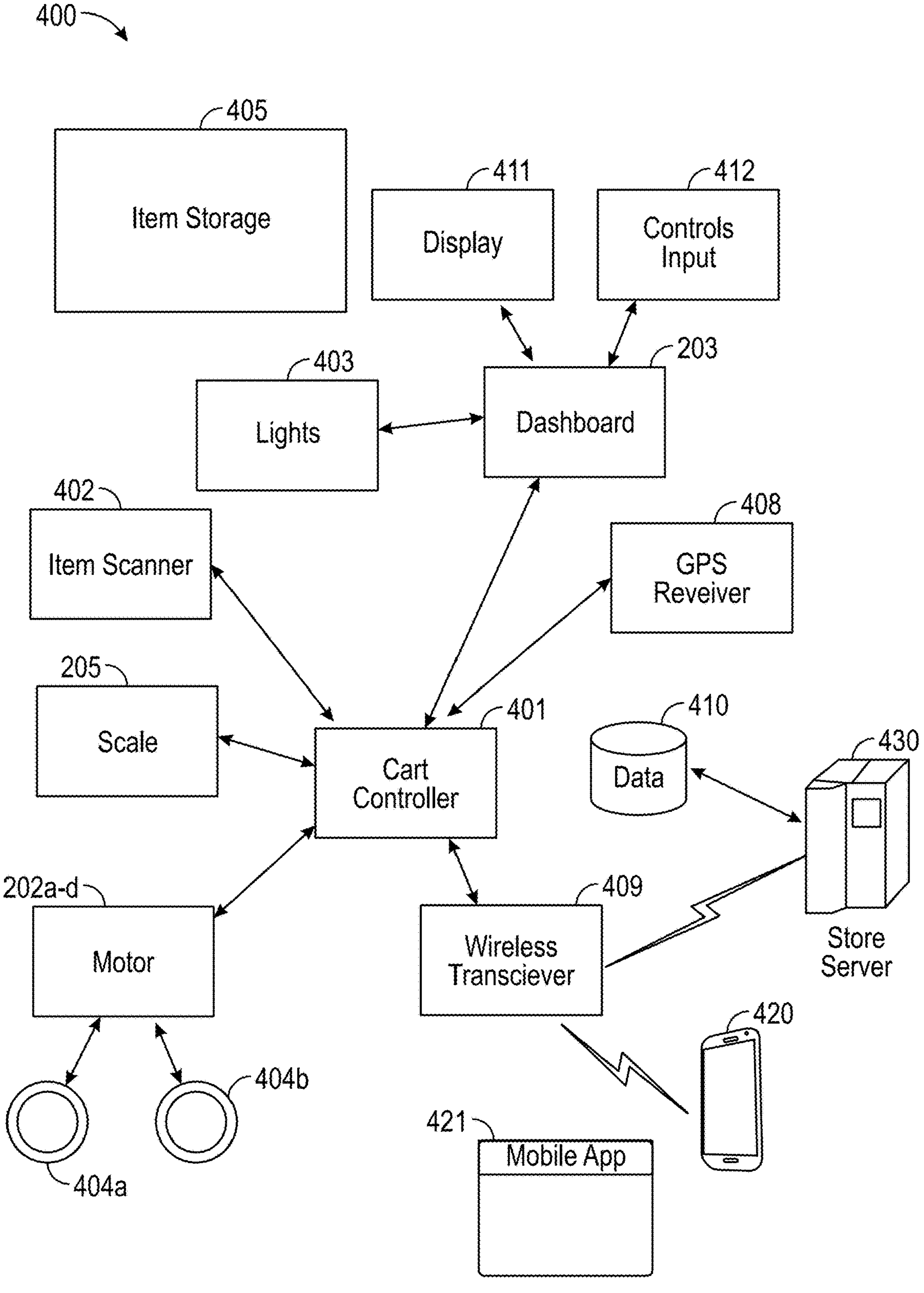
FIG. 4 illustrates a block diagram of an article of manufacture providing a high-tech shopping cart according to the present invention.

FIG. 4 illustrates a block diagram of an article of manufacture providing a high-tech shopping cart according to the present invention. Components of the shopping cart 100 comprise the cart controller 401, an item scanner 402, lights and turn signals 403, a scale 205, a dashboard 203 having a display device 411 and control input devices 412, one or more motors 202*a-d* coupled to the wheels 404*a-b*, and a wireless transceiver 409 communicatively coupled to the store server 430 and database 410, and to a mobile application on a shopper's mobile device 420 such as a smartphone.

The cart controller 401 comprises a programmable processing device coupled to the components of the shopping cart 100 to implement the functions performed herein. The cart controller communicates instructions to the other components 402-410 to perform specific functions otherwise disclosed herein. The cart controller 401 maintains the contents of the shopping cart 100 as the shopper selects items to purchase. When purchasing an item, the shopper scans the item with the item scanner 402 and/or places it in the shopping cart 100. The cart controller 401 or the mobile application 421 on the shopper's mobile device 420 calculates the total price and shows the balance to the shopper on the display device 411 of the dashboard. When a customer removes an item from the shopping cart, the database subtracts the item automatically. If someone removes the bar code on the packaging and places an item in the shopping cart, the system will still read data from an item tracker in the item.

The cart controller 401 also receives a weight value from the scale 205 and calculates an item's weight as it is placed on the scale in the cart 100 while shopping. If weighing another item, the shopper may use control inputs 412 on the dashboard 203. For example, in one embodiment, the store may provide a scale machine with a printing label. The customer may place the item in a clear plastic bag, and then place it in the scale. The scale machine may print the label and the customer may put the label in a bag and/or the shopping cart. The shopping cart may read the item and continue the process.

The cart controller 401 allows the shopper to enter a shopping budget. For example, the cart controller 401 may determine when the total cost of selected items in the shopping cart 100 is a value between a shopper-specified minimum value and a shopper-specified maximum value. The current total cost of selected items in the shopping cart 100 is displayed to the shopper. The display 411 also may indicate when the current total cost is approaching and/or exceeds the shopper-specified minimum value and the shopper-specified maximum value.

The item scanner 402 reads barcodes on selected items for use in obtaining price and product information for use by the cart controller 401 and/or the mobile application 421. The item scanner 402 may be an optical barcode scanner in one embodiment. Alternatively, the item scanner 402 may be an RFID reader that communicates with item tracker devices within each selected item. This unique identifier obtained by the item scanner 402 is sent to the cart controller 401 for use in its operations.

The lights and turn signals 403 comprise headlight lamps and turn signal lamps on the cart's outer surfaces to permit the shopper to navigate the shopping cart 100 within the store, as well as outside the store when returning to a vehicle with the selected items. The lights and turn signals 403 are controlled using control input devices 412 on the dashboard 203 including on/off switches and/or activation devices.

The scale 205 is a device that obtains a weight value for a selected item placed onto the scale 205. The weight value generated by the scale 205 is transmitted to the cart controller 401 for use in determining the price of the selected item being weighed. The item scanner 205 may generate weight values in one of any number of weight value units such as oz., lbs., or other units. The cart controller 401 may convert the weight value obtained by the scale 205 along with a unit price for the selected items obtained using the unique identifier generated by the item scanner 402.

The dashboard 203 having the display device 411 and control input devices 412 provides a shopper with control devices to use in the shopping cart 100 throughout the shopping activity. The control input devices 412 contain a plurality of switches, levers, and related input devices that provide shopper command signals to activate and deactivate the various components disclosed herein. The display device 411 provides a visual output device for displaying information associated with one or more of the selected items within the shopping cart 100, the current total costs of the selected items in the shopping cart, and shopper-specified budget information disclosed herein.

When a shopper wants to move the shopping cart 100 from one location to another within the store, a handle on the dashboard may be utilized. The handle of the shopping cart 100 has the following controls:

a) Move the cart handle forward for the cart to go forward;
b) Move the cart handle backward for the cart to go back;
c) Release the handle for the cart to stop; and
d) The front of the cart has the same controls if the customer wants to manage the cart in front.

The dashboard transmits command signals to the cart controller 401 and/or the one or more motors 202*a-d* coupled to the wheels 404*a-b* that operate to move the shopping cart 100 as instructed.

The one or more motors 202*a-d* coupled to the wheels 404*a-b* cause the wheels 404*a-b* and/or axles (not shown) to steer and move the shopping cart 100. The one or more motors 202*a-d* may operate in both forward and reverse directions to control the motion of the wheels 404*a-b* and the shopping cart. The one or more motors 202*a-d* are powered by an electric battery having a storage capacity of energy to operate the shopping cart 100 for at least 2 hours in a preferred embodiment.

The wireless transceiver 409 is communicatively coupled to the store server 430 having the database 410 and to a mobile application 421 on a shopper's mobile device 420 such as a smartphone. The wireless transceiver 409 creates a wireless connection in accordance with any IEEE 802.11 Wi-Fi protocols, Bluetooth protocols, Bluetooth Low Energy (BLE), or other short range protocols that operate in accordance with wireless technology standards for exchanging data over short distances using any licensed or unlicensed band such as the citizens broadband radio service (CBRS) band, 2.4 GHz bands, 5 GHz bands, or 6 GHz bands. Additionally, the connection 409 can be implemented using a wireless connection that operates in accordance with, but is not limited to, RF4CE protocol, ZigBee protocol, Z-Wave protocol, or IEEE 802.15.4 protocol. It is also contemplated by the present invention that the connection 409 can include connections to a media over coax (MoCA) network.

The mobile application 421 on the shopper's mobile device 420 may be utilized to connect the store app to the shopping cart database or smartphone. Shoppers can choose selected items to purchase on the mobile device 420. The mobile device 420 may comprise a smartwatch, tablet device, and other mobile devices in addition to a smartphone. When a customer arrives at a store, the GPS tells exactly where to find desired items within the store. The cart controller 401 or the mobile application 420 may inform the shopper where a desired item is in the store for time savings. Any special sale or discount will appear in the store server 430 and its database 410 and may be communicated to the cart controller 401 or the mobile application 420 for display to the shopper.

The mobile application 421 may contain payment information; for example, a credit card number and/or a bank account number with a corresponding routing number, to automatically obtain payment as the shopper exits the store. If paying by cash, the customers need to go to the cashier. The cashier will scan the shopping cart 100 to get the info from the mobile application 421 and/or cart controller 401 to determine the amount owed.

The mobile application 421 and/or cart controller 401 reports to the store server 430 each time a selected item is placed into a shopping cart 100, making the information available to store personnel as well as adjusting inventory data associated with the selected item. Using this data, the store personnel can view the customer's cart and see what is in the cart. The mobile application 421 and/or cart controller 401 may maintain budget information entered by the shopper for comparison with a total cost of selected items deposited within the shopping cart 100. Shoppers may add on the shopping budget to continue shopping. When a shopper removes an item from the shopping cart, the price of the returned item is subtracted from a cost value of the selected items in the shopping cart 100 and the store server 430 and its database 410 automatically adjusts the store inventory accordingly.

Figure 5:
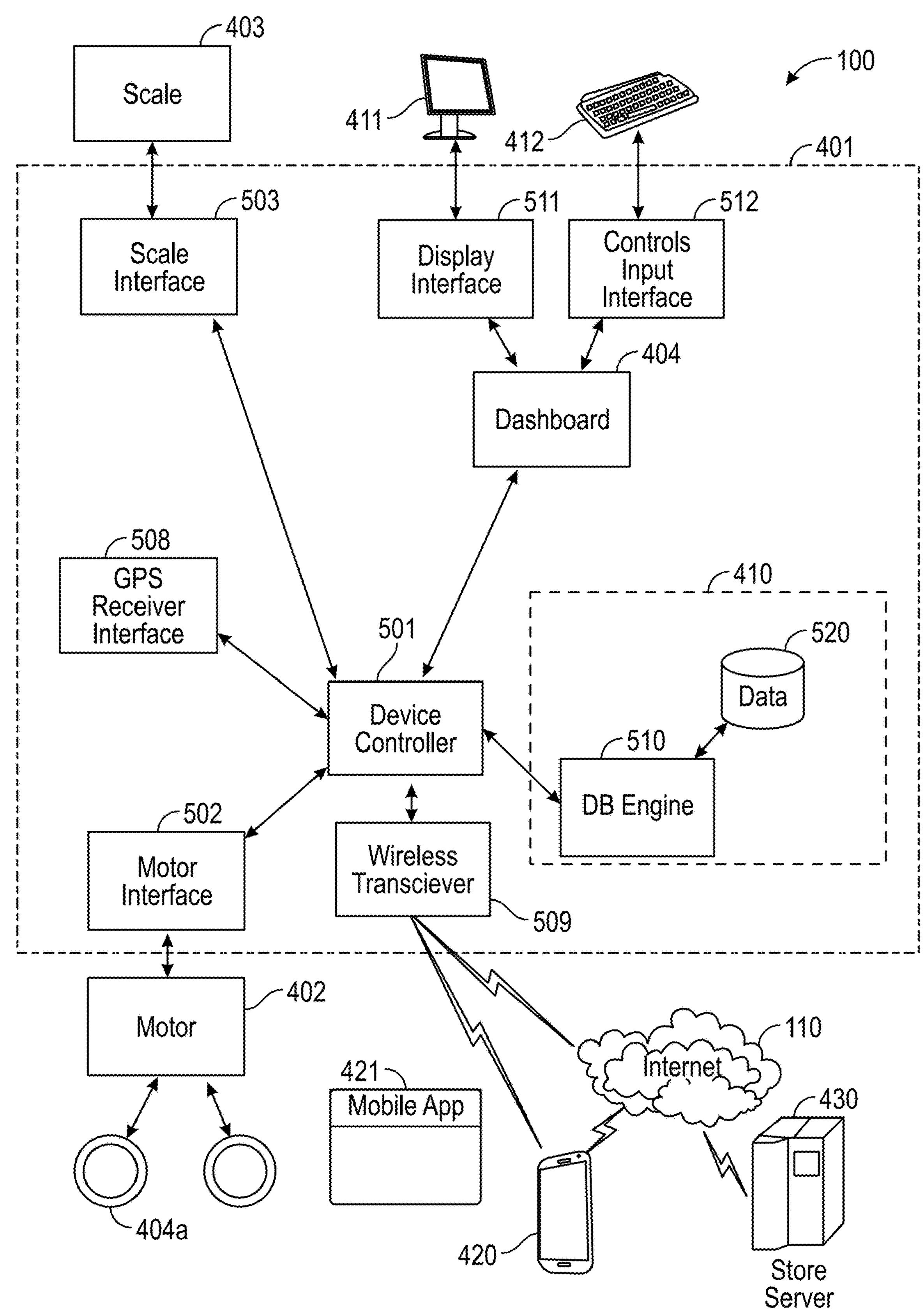
FIG. 5 illustrates a block diagram of electrical components in an article of manufacture providing a high-tech shopping cart according to the present invention.

FIG. 5 illustrates a block diagram of electrical components in an article of manufacture providing a high-tech shopping cart according to the present invention. The electric components of the shopping cart 100 comprise a device controller 501, a motor interface 502 coupled to the one or more motors 202*a-d*, a scale interface 503, the selected item database 410, the dashboard 404 having a display interface 511 and a control input interface 512, a GPS receiver interface 508, and a wireless communication interface 409. The device controller 501 is a computing subsystem, an example of which is disclosed herein with reference to FIG. 7. The device controller 501 utilizes a plurality of commands such as software-based instructions to implement the functions of the shopping cart.

The motor interface 502 coupled to the one or more motors 202*a-d* provides an electrical interface between the device controller 501 and the motors 202*a-d* permitting the cart controller 401 to command the operation of the shopping cart 100. The motor interface 502 contains interface-connecting electronics needed to connect the cart controller 401 to the motors, 402 including electrical signal translation, electrical signal drivers and receivers, and cable connectors used to enable the communications to occur. Electrical circuits within the motor interface 502 may utilize various electronic devices including TTL, CMOS, ECL, electro-optical devices, and other electrical technologies.

The scale interface 503 provides an electrical interface between the device controller 501 and the scale 205 permitting the cart controller 401 to command the operation of the scale 205. The scale interface 503 contains interface-connecting electronics needed to connect the cart controller 401 to the scale 205 including electrical signal translation, electrical signal drivers and receivers, and cable connectors used to enable the communications to occur. Electrical circuits within the scale interface 503 may utilize various electronic devices including TTL, CMOS, ECL, electro-optical devices, and other electrical technologies.

The selected item database 410 stores price and product data for each of the selected items offer for sale in the store. The selected item database 410 is searchable to obtain this data for each selected item. Additionally, the selected item database 410 provides the product data used when the corresponding selected item is placed within the shopping cart 100.

The dashboard 404 has a display interface 511 and a control input interface 512. The display interface 511 provides an electrical interface between the device controller 501 and the display device 411 permitting the cart controller 401 to command the operation of the display device 411 including transmission of data to be displayed on the display device 411. The display interface 511 contains interface-connecting electronics needed to connect the cart controller 401 to the display device 411, including electrical signal translation, electrical signal drivers and receivers, and cable connectors used to enable the communications to occur. Electrical circuits within the display interface 411 may utilize various electronic devices including TTL, CMOS, ECL, electro-optical devices, and other electrical technologies.

Figure 6A:
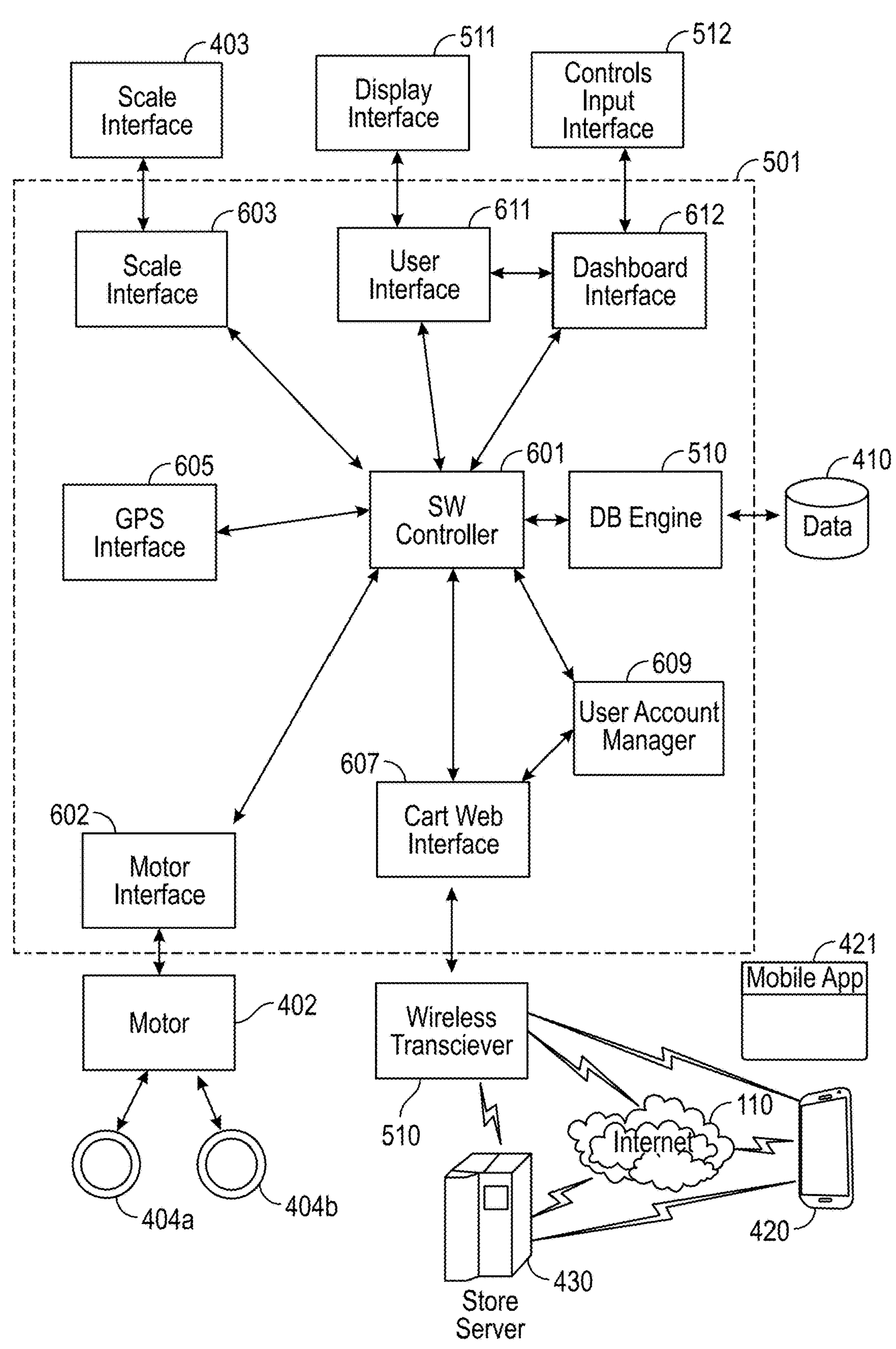
FIGS. 6*a-c* illustrates a set of software components used within an article of manufacture providing a high-tech shopping cart according to the present invention.
Figure 6B:
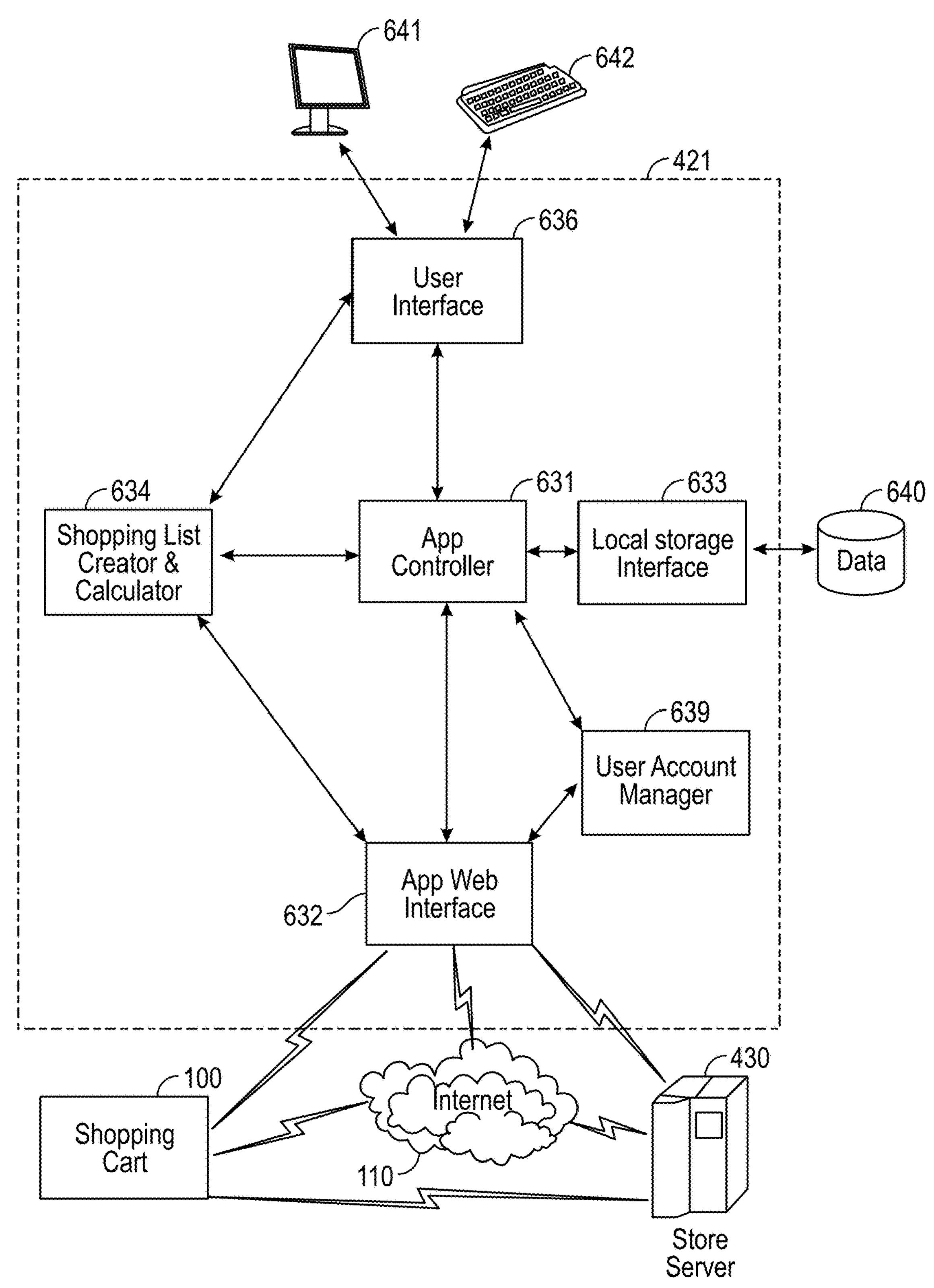
Figure 6C:
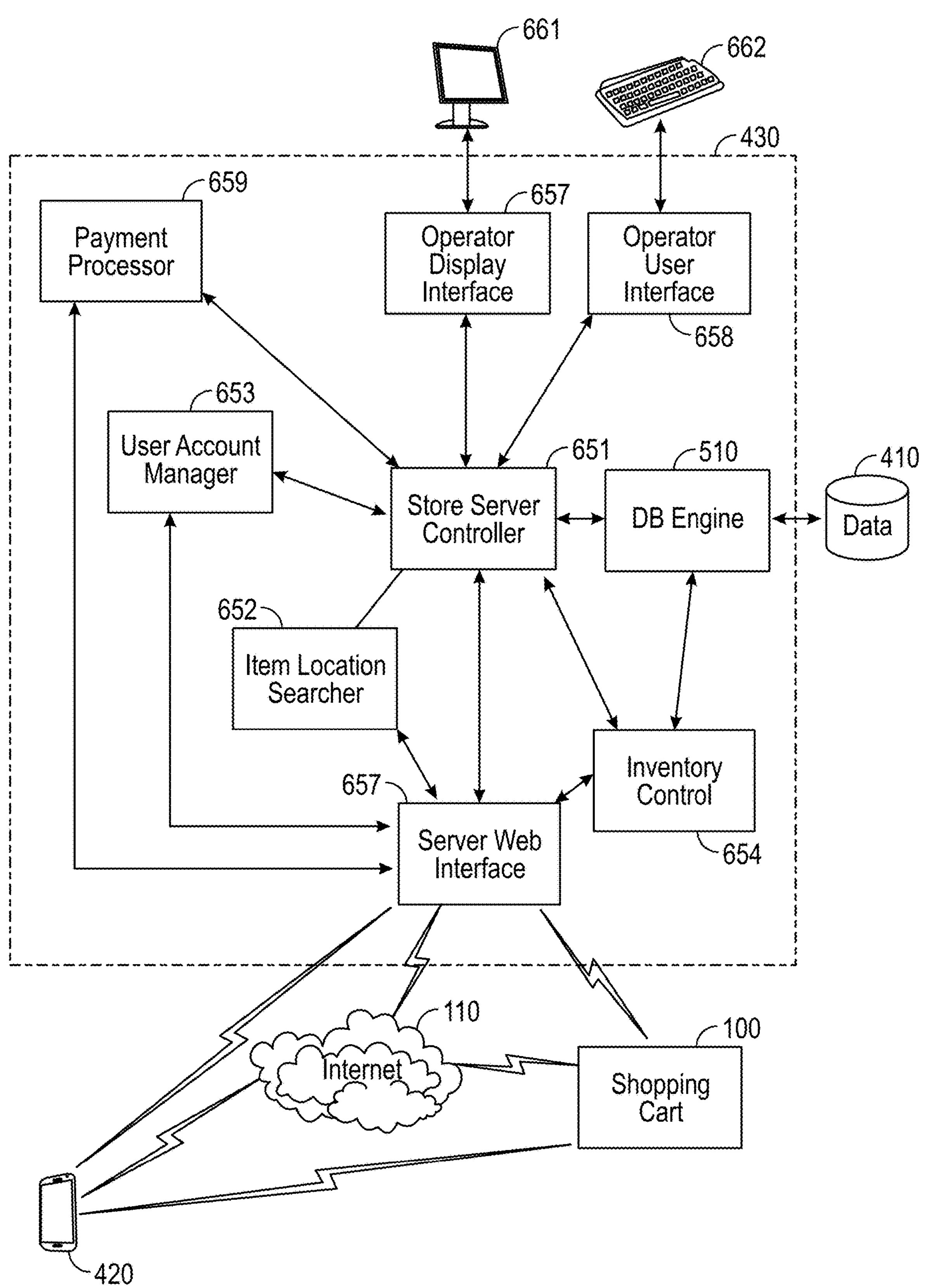

The control input interface 512 provides an electrical interface between the device controller 501 and the control input devices such as switches, levers, and related user input devices permitting the cart controller 401 to command the operation of the shopping cart 100. The control input interface 512 contains interface-connecting electronics needed to connect the cart controller 401 to the control input devices including electrical signal translation, electrical signal drivers and receivers, and cable connectors used to enable the communications to occur. Electrical circuits within the control input interface 512 may utilize various electronic devices including TTL, CMOS, ECL, electro-optical devices, and other electrical technologies The GPS receiver interface 508 provides an electrical interface between the device controller 501 and a GPS receiver (not shown) permitting the cart controller 401 to obtain GPS location data associated with a location of the shopping cart 100 and an item. The GPS receiver interface 508 contains interface-connecting electronics needed to connect the cart controller 401 to the GPS receiver including electrical signal translation, electrical signal drivers and receivers, and cable connectors used to enable the communications to occur. Electrical circuits within the GPS receiver interface 508 may utilize various electronic devices including TTL, CMOS, ECL, electro-optical devices, and other electrical technologies The wireless communication interface 509 provides an electrical interface between the device controller 501 and the wireless transceiver 409 permitting the cart controller 401 to command the operation of the wireless transceiver 409. The wireless communication interface 509 contains interface-connecting electronics needed to connect the cart controller 401 to the wireless transceiver 409 including electrical signal translation, electrical signal drivers and receivers, and cable connectors used to enable the communications to occur. Electrical circuits within the wireless communication interface 509 may utilize various electronic devices including TTL, CMOS, ECL, electro-optical devices, and other electrical technologies FIGS. 6*a-c* illustrate a set of software components used within an article of manufacture providing a high-tech shopping cart according to the present invention. FIG. 6*a* shows the set of software components within the cart controller 401. FIG. 6*b* shows the set of software components within the mobile application 421 within the mobile device 420. FIG. 6*c* shows the set of software components within the store server 430.

FIG. 6*a* shows the set of software components within the cart controller 401. The set of software components within the cart controller 401 comprises a shopping cart software (SW) controller 601, a motor interface 602, a scale interface 603, a shopping cart web interface 607, a user account manager 609, a user interface 611 and a dashboard interface 612.

The shopping cart SW controller 601 acts as a central overall controller for the set of software components 601-612. User commands from the mobile app user interface 636 are received and processed to determine actions to be taken, and then mobile app commands are passed to the other software components 601-612, as needed, to implement the actions to be taken. The mobile app controller 601 also works with the mobile app user account manager 609 to determine whether or not a particular user of the shopping cart 100 at any particular point in time is authorized to access particular data entries within the database 410 and to take particular actions that may be requested. As such, different user accounts may be authorized to perform an individual user set of tasks associated with each user and to access a particular subset of data. The mobile application controller 601 is responsible for enforcing these security privileges.

The motor interface 602 permits the cart controller 401 to communicate with one or more motors 202*a-d*. The motor interface 602 performs all of the data formatting, computer-to-computer communications, encryption processing, and all similar operations needed by the cart controller 401 to communicate with users.

The scale interface 603 permits the cart controller 401 to communicate with the scale 205 to obtain weight data associated with a selected item that has been placed on the scale 205. The scale interface 603 performs all of the data formatting, computer-to-computer communications, encryption processing, and all similar operations needed by the cart controller 401 to communicate with users.

The shopping cart web interface 607 permits the cart controller 401 to communicate with remote user mobile devices 420 and the store server 430. The shopping cart web interface 607 performs all of the data formatting, computer-to-computer communications, encryption processing, and all similar operations needed by the cart controller 401 to communicate with the store server 430 and mobile applications 421 on shoppers' mobile devices 420.

The user account manager 609 permits shoppers, store employees, and store server operators to connect to and access the cart controller 401. The user account manager 609 is responsible for creating and managing user accounts for the shoppers, store employees, and store server operators. The user account manager 609 also is used in authenticating a user based upon user input. Typically, the user input uses a username and password. Multi-factor authentication, use of one-time passwords, and similar secure authentication mechanisms may be included in the user profile. For every sign in the system will recognize the user type, i.e. shopper, store employee, and store server operator, along with all past activities from account details in the database. Based on user type, the cart controller 401 behavior may change.

The user interface 611 provides output processing to provide a driver with messages and data needed to perform the shopping cart 100 and cart controller 401 functions. This user interface 611 also accepts commands from the driver to instruct the shopping cart 100 and cart controller 401 to perform these tasks.

The dashboard interface 612 provides input processing to provide a driver with messages and data needed to perform the shopping cart 100 and cart controller 401 functions. This dashboard interface 612 also accepts commands from the driver to instruct the shopping cart 100 and cart controller 401 to perform these tasks FIG. 6*b* shows the set of software components within the mobile application 421 within the mobile device 420. The set of software components within the mobile application 421 comprises a mobile app controller 631, a mobile app web interface 632, a local storage interface 633, a shopping list creator and cost calculator 634, a mobile app user interface 636, and a mobile app user account manager 639. The mobile app controller 631 acts as a central overall controller for the set of software components 631-639. User commands from the mobile app user interface 636 are received and processed to determine actions to be taken, and then mobile app commands are passed to the other software components 631-639, as needed, to implement the actions to be taken. The mobile app controller 631 also works with the mobile app user account manager 639 to determine whether or not a particular user of the mobile application 421 at any particular point in time is authorized to access particular data entries within the database 410 and to take particular actions that may be requested. As such, different user accounts may be authorized to perform an individual user set of tasks associated with each user and to access a particular subset of data. The mobile application controller 631 is responsible for enforcing these security privileges.

The mobile app web interface 632 permits the mobile app 421 to communicate with remote user mobile devices 420 and the store server 430. The mobile app web interface 632 performs all of the data formatting, computer-to-computer communications, encryption processing, and all similar operations needed by the mobile application 421 to communicate with the store server 430 and shopping cart 100 controllers 401.

The local storage interface 633 provides input and output processing to provide a driver with messages and data needed to perform the shopper mobile application functions. This local storage interface 633 also accepts commands from the store server controller 631 to instruct the store server 430 to perform local data storage save and retrieval operations.

The shopping list creator and cost calculator 634 permit the shopper to create a list of selected items using the mobile application 421 to be purchased by the shopper. The shopping list creator and cost calculator 634 also receive an indication of each selected item placed into the shopping cart 100. The shopping list creator and cost calculator 634 receives the number of selected items of each type with the number and its price to calculate a current total cost for the items within the shopping cart 100. The shopping list creator and cost calculator 634 may update the list of selected items displayed by the mobile application 421 indicating when the shopper has obtained the desired number of selected items using the mobile application 421.

The mobile app user interface 636 provides input and output processing to provide a driver with messages and data needed to perform the mobile application 421 functions. This mobile app user interface 636 also accepts commands from the shoppers to instruct the mobile application 4201 to perform these tasks.

The mobile app user account manager 639 is responsible for creating and managing user accounts for the shoppers, store employees, and store server operators. The mobile app user account manager 639 also is used in authenticating a user based upon user input. Typically, the user input uses a username and password. Multi-factor authentication, use of one-time passwords, and similar secure authentication mechanisms may be included in the user profile. For every sign in the system will recognize the user type, i.e. shopper, store employee, and store server operator, along with all past activities from account details in the database. Based on user type, the mobile application 421 behavior may change.

FIG. 6*c* shows the set of software components within the store server 430. The set of software components within the store server 430 comprises a store server controller 651, a server web interface 652, a database engine 510, an item location searcher 652, a mobile app user account manager 653, an inventory control manager 654, an operator display interface 657, an operator user interface 658 and a payment processor 659. The store server controller 651 acts as a central overall controller for the set of software components 651-659. User commands from the mobile app user interface 636 are received and processed to determine actions to be taken, and then store server commands are passed to the other software components 651-659, as needed, to implement the actions to be taken. Selected item search queries also are received from the shopping cart 100 and the mobile application 421 to search and retrieve selected item product price and product information. The mobile app controller 631 also works with the mobile app user account manager 653 to determine whether or not a particular user of the mobile application 421, shopping cart 100, or store server at any particular point in time is authorized to access particular data entries within the database 410 and to take particular actions that may be requested. As such, different user accounts may be authorized to perform an individual user set of tasks associated with each user and to access a particular subset of data. The mobile application controller 631 is responsible for enforcing these security privileges.

The server web interface 652 permits the store server 430 to communicate with remote user mobile devices 420 and the shopping cart controller 401. The web interface performs all of the data formatting, computer-to-computer communications, encryption processing, and all similar operations needed by the store server 430 to communicate with users.

The database engine 510 processes all database operations for the selected item data used by the shopping cart 101. These operations include insertion of selected item profiles into the database 410, deletion of selected item profiles from the database 410, searching and retrieving selected item profiles from the database 410, and indexing the database 410 to maintain efficient searching when needed. The database engine 410 is shown being located within the store server 430 in which requests for selected item data is transmitted from the shopping cart 100 and/or the mobile application 421 with the results of the query requests returned to the requesting device. One skilled in the art may recognize that the database 410 and the database engine 510 may be duplicated and stored within the cart controller 401 of the shopping cart 100 and/or the mobile application 421 within the mobile device 420.

The item location searcher 652 tracks the location of each selected item for sale at the store. The cart processor 401 of the shopping cart 100 and the mobile application may generate requests for location data associated with a particular selected item that is sent to the item location searcher 652. The item location searcher 652 returns location data in the store for the particular selected item with directions on where the item may be obtained. The item location searcher 652 coordinates with the inventory control manager 654 as the number and the location of each selected item is placed into and/or returned from a shopping cart 100 to permit the item location searcher 652 to provide up-to-date information to shoppers when they are searching for a particular item.

The high-tech shopping cart system user account manager 653 is responsible for creating and managing user accounts for the shoppers, store employees, and store server operators. The high-tech shopping cart system user account manager 653 also is used in authenticating a user based upon user input. Typically, the user input uses a username and password. Multi-factor authentication, use of one-time passwords, and similar secure authentication mechanisms may be included in the user profile. For every sign in the system will recognize the user type, i.e. shopper, store employee, and store server operator, along with all past activities from account details in the database. Based on user type, the store server 430 behavior may change.

The inventory control manager 654 is responsible for maintaining inventory records for the selected items available at the store for purchase by shoppers. The inventory control manager 654 receives indications that a particular selected item has been placed into a shopping cart 100 for purchase, receives indications that a particular selected item has been returned from a shopping cart 100 after being checked into the shopping cart 100, and receives indications that a particular shopper's shopping list of items checked into the corresponding shopping cart 100 has been paid for by the shopper. All of these indications are tracked by the inventory control manager 654 to maintain a current status of the number of each selected item available for sale present at the store. The store server 430 may periodically generate requests to obtain replacements for each selected item when the number of available items drops below a specified threshold. The number of each selected item available for sale is also updated each time a supplier makes a delivery of items ordered to replenish the previously sold items.

The operator display interface 657 provides output processing to provide a driver with messages and data needed to perform the store server 430 and database 410 functions. This operator display interface 657 also accepts commands from the operator to instruct the store server 420 to perform these tasks.

The operator user interface 658 provides input and output processing to provide a driver with messages and data needed to perform the store server 430 and database 410 functions. This operator user interface 658 also accepts commands from the operator to instruct the store server 420 to perform these tasks.

The payment processor 659 processes a shopper's checkout payment operations when a shopper has completed the shopping and is leaving the store. The payment processor 659 receives a total price amount from the cart controller 401 of the shopping cart 100 or from the mobile application 421 along with the identity of the shopper. The payment processor 659 retrieves payment information associated with the shopper from the high-tech shopping cart system user account manager 653 to create a payment request. The payment request is transmitted to a banking payment processing system (not shown) requesting that the requested amount be transferred to the store accounts receivable account while charging the shopper's account. The payment processor 659 receives a responsive message from the banking payment processing system indicating whether the payment amount has been transferred, and if not, provides a reason for the failure to complete the transaction. A message providing the shopper with confirmation of the payment or payment failure is sent by the payment processor 659 to the shopping cart 100 and/or the mobile application 421.

Figure 7:
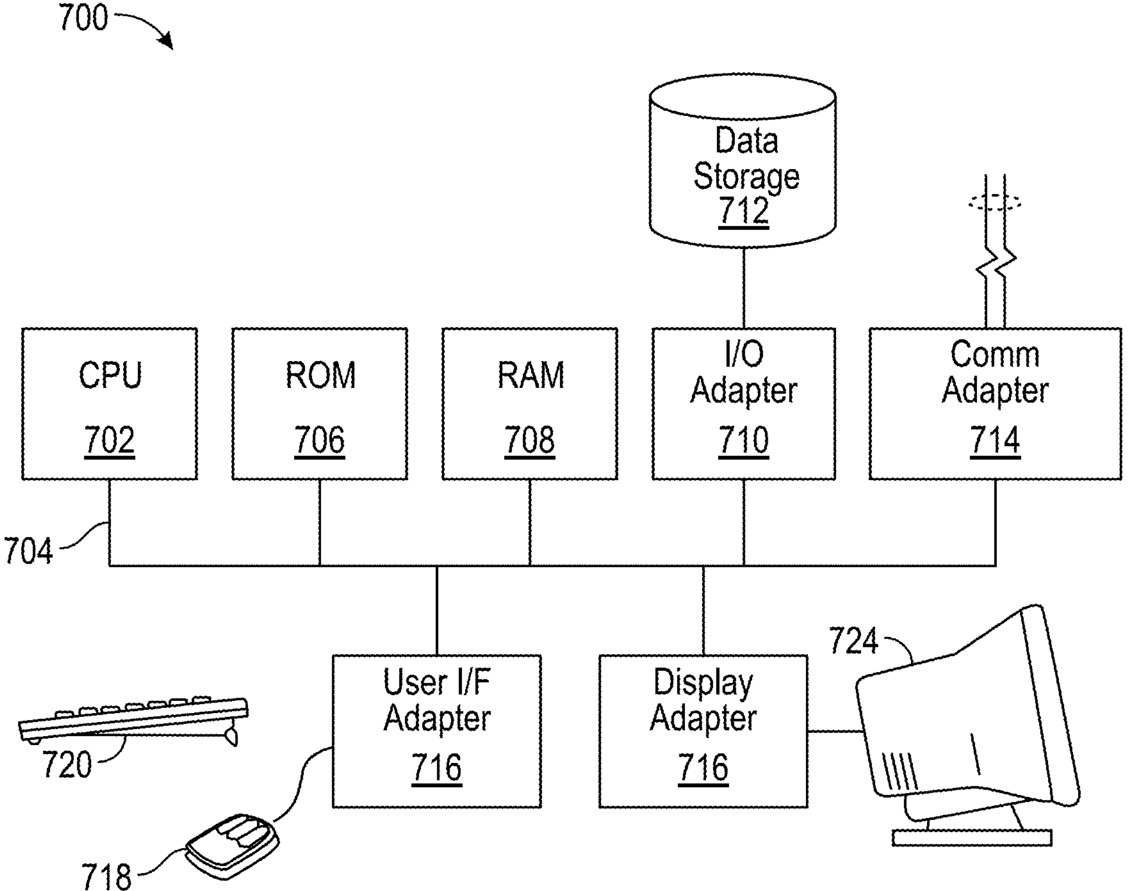
FIG. 7 illustrates a generalized schematic of a programmable processing system utilized as the various computing components described herein used to implement an embodiment of the present invention.

FIG. 7 illustrates a generalized schematic of a programmable processing system utilized as the various computing components described herein used to implement an embodiment of the present invention. The central processing unit ("CPU") 702 is coupled to the system bus 704. The CPU 702 may be a general-purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 also may include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 also may include read-only memory (ROM) 706 which may be PROM, EPROM, EEPROM, optical storage, or the like. The ROM 706 may store configuration information for booting the computer system 700. The RAM 708 and the ROM 706 hold user and system data, and both the RAM 708 and the ROM 706 may be randomly accessed.

The computer system 700 also may include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid-state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 110, which may be one or more of a LAN, WAN, and/or the Internet. The communications adapter 714 also may be adapted to couple the computer system 700 to other networks such as a global positioning system (GPS) or a Bluetooth network. The user interface adapter 716 couples user input devices, such as a keyboard 720, a pointing device 718, and/or a touch screen (not shown) to the computer system 700. The keyboard 720 may be an on-screen keyboard displayed on a touch panel. Additional devices (not shown) such as a camera, microphone, video camera, accelerometer, compass, and or gyroscope may be coupled to the user interface adapter 716. The display adapter 722 may be driven by the CPU 702 to control the display on the display device 624. Any of the devices 702-722 may be physical and/or logical.

The applications of the present invention are not limited to the architecture of the computer system 700. Rather the computer system 700 is provided as an example of one type of computing device that may be adapted to perform the functions of a computing device and/or the user interface device 710. For example, any suitable processor-based device may be utilized including, without limitation, personal data assistants (PDAs), tablet computers, smartphones, computer game consoles, and multi-processor servers. Moreover, the systems and methods of the present invention may be implemented on application-specific integrated circuits (ASIC), very large-scale integrated (VLSI) circuits, state machine digital logic-based circuitry, or other circuitry.

The embodiments described herein are implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules. As such, persons of ordinary skill in the art may utilize any number of suitable electronic devices and similar structures capable of executing a sequence of logical operations according to the described embodiments. For example, the computer system 600 may be virtualized for access by multiple users and/or applications.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A high-tech shopping cart comprising:
four wheels for movement within a retail establishment;
a top frame defining a single item container;
a bottom frame connected to the four wheels;
wherein the single item container comprises a plurality of storage compartments for accommodating a plurality of selected items;
a controller configured to manage item selection and calculate a total purchase price;
a database communicatively coupled with the controller, the database storing information related to the plurality of selected items;
a user interface comprising a display device and a plurality of control input devices;
a plurality of sensors connected to the top frame, a battery for power supply, and at least one motor for autonomous movement of the high-tech shopping cart; and
a stair climbing mechanism connected to the bottom frame, the stair climbing mechanism comprising an automatic descending winch.

2. The high-tech shopping cart of claim 1 wherein the four wheels are individually connected to a plurality of electric motors to enable independent movement.

3. The high-tech shopping cart of claim 1 further comprising an automated locking hard cover to secure the plurality of selected items within the high-tech shopping cart.

4. The high-tech shopping cart of claim 1 wherein the controller is configured to track a budget as the plurality of selected items are chosen within the retail establishment.

5. The high-tech shopping cart of claim 1 wherein the user interface comprises a dashboard with a computer screen display and a plurality of user input controls.

6. The high-tech shopping cart of claim 1 further comprising a wireless transceiver configured to communicate with a store database and a mobile application on a mobile device.

7. The high-tech shopping cart of claim 1 further comprising a plurality of light emitting diode lights for illumination.

8. The high-tech shopping cart of claim 1 wherein the plurality of sensors are configured to halt a movement of the high-tech shopping cart.

9. The high-tech shopping cart of claim 1 wherein the database stores a plurality of expiration dates and price data for a plurality of merchandise within the retail establishment.

* * * * *